United States Patent
Meier et al.

(10) Patent No.: US 7,542,572 B2
(45) Date of Patent: Jun. 2, 2009

(54) METHOD FOR SECURELY AND AUTOMATICALLY CONFIGURING ACCESS POINTS

(75) Inventors: Robert C. Meier, Cuyahoga Falls, OH (US); Nancy Cam Winget, Mountain View, CA (US); Robert Bell, Bountiful, UT (US)

(73) Assignee: Cisco Technology, Inc.

( * ) Notice: Subject to any disclaimer, the term of this patent is extended or adjusted under 35 U.S.C. 154(b) by 917 days.

(21) Appl. No.: 11/000,608

(22) Filed: Dec. 1, 2004

(65) Prior Publication Data

US 2006/0114839 A1   Jun. 1, 2006

(51) Int. Cl.
*H04L 9/00* (2006.01)
(52) U.S. Cl. .......................................... 380/277; 726/1
(58) Field of Classification Search ................. 370/316, 370/254, 310, 400; 713/200, 201; 380/277; 709/203, 221, 238; 705/40
See application file for complete search history.

(56) References Cited

U.S. PATENT DOCUMENTS

| | | | |
|---|---|---|---|
| 6,643,274 B2 * | 11/2003 | D'Annunzio | 370/316 |
| 7,099,337 B2 * | 8/2006 | Pinto | 370/400 |
| 7,349,884 B1 * | 3/2008 | Odom et al. | 705/40 |
| 2003/0234741 A1 | 12/2003 | Rogers et al. | |
| 2004/0051664 A1 | 3/2004 | Frank | |
| 2004/0098610 A1 * | 5/2004 | Hrastar | 713/200 |
| 2004/0179690 A1 * | 9/2004 | Soliman | 380/277 |
| 2004/0202330 A1 * | 10/2004 | Harvey et al. | 380/277 |
| 2004/0246911 A1 * | 12/2004 | Bonsma et al. | 370/254 |
| 2005/0044265 A1 * | 2/2005 | Vinel et al. | 709/238 |
| 2005/0066194 A1 * | 3/2005 | Campbell et al. | 713/201 |
| 2005/0160138 A1 * | 7/2005 | Ishidoshiro | 709/203 |
| 2005/0188063 A1 * | 8/2005 | Finley et al. | 709/221 |
| 2005/0201299 A1 * | 9/2005 | Radi et al. | 370/254 |
| 2005/0226175 A1 * | 10/2005 | Gupta et al. | 370/310 |

OTHER PUBLICATIONS

TeleMIP: telecommunications-enhanced mobile IP architecture forfast intradomain mobility; Das, S; Date: Aug. 2000; INSPEC; vol. 7, issue 4; pp. 50-58.*

* cited by examiner

*Primary Examiner*—Kambiz Zand
*Assistant Examiner*—Monjour Rahim
(74) *Attorney, Agent, or Firm*—Tucker Ellis & West LLP

(57) ABSTRACT

The present invention is contemplates an automatic, secure AP configuration protocol. Public/private keys and public key (PK) methods are used to automatically establish a mutual trust relationship and a secure channel between an AP and at least one configuration server. An AP automatically forwards a location identifier to the configuration server, and the configuration server delivers common, AP specific, and location specific configuration parameters to the AP.

30 Claims, 3 Drawing Sheets

METHOD FOR SECURELY AND AUTOMATICALLY CONFIGURING ACCESS POINTS

BACKGROUND OF THE INVENTION

The present invention relates generally to wireless local area networks (WLANs) and more specifically to methods for automatically and securely configuring access points, wireless switches and other hardware to be coupled to the network.

802.11 Access Points (APs) provide 802.11 clients secure, wireless access to a wireless local area network (WLAN). In an enterprise WLAN, 802.11 clients can roam transparently between consistently configured APs. Currently, APs must be configured with operational parameter values that are a) common for all APs in a WLAN, b) Access Point (AP) specific, and/or c) location specific. AP specific parameters may include a secret RADIUS (Remote Authentication Dial-In User Service) key or authentication password. Location specific parameters may include client subnet bindings or the Internet Protocol (IP) address of a local AP manager.

The number of APs in an enterprise campus network can be very large (e.g., hundreds or thousands); therefore, manually configuring each AP is often tedious, error prone, and labor intensive. In a common scenario, a large number of unconfigured 802.11 APs are delivered to a customer site, where a third-party installation contractor installs the APs, often in inaccessible areas. The installation contractor is ordinarily neither qualified nor authorized to configure the APs. Since APs are configured with location specific information, an authorized IT manager cannot pre-configure an AP until the AP's location is determined.

BRIEF SUMMARY OF THE INVENTION

In accordance with an aspect of the present invention, the present invention is directed to a method for securely and automatically configuring network components, such as an 802.11 access point (AP) or a wireless switch that is connected to a relatively dumb AP like radio modules, wherein the AP configuration is in the wireless switch. Ideally, it should be possible for a configuration management station (CMS), such as the Cisco Wireless LAN Solutions Engine (WLSE), available from Cisco Technology, Inc., 170 West Tasman Drive, San Jose, Calif. 95134, to automatically and securely configure a new AP when the AP is initially installed so that a customer can securely install a new AP or a replacement AP "out-of-the-box" without any manual configuration.

In accordance with an aspect of the present invention, strong security can be enabled on an AP. When strong security is enabled on an AP, then a Public Key (PK) certificate (e.g., an X.509 certificate) and/or a Public Key for the manufacturer or assigned to the customer, for example a Cisco Certificate Authority (CA) available from Cisco Systems, Inc., is securely installed on the AP (e.g., at the factory or via some other physically secure methods). The AP's certificate can be self-signed and/or it can be signed by a certificate authority, such as a Cisco CA.

In accordance with an aspect of the present invention, a customer establishes an Authorized AP list in a secure database. Each entry in the list includes the PK identifier of the respective AP. If AP certificates are self-signed, then each entry contains the public key of the respective AP. Alternatively, for convenience, an online database containing signed AP certificates is employed. For example, a set of AP certificates could be retrieved by customer order number. The online database would not necessarily have to be secure.

In accordance with an aspect of the present invention, a signed PK certificate (for example a Cisco signed certificate available from Cisco Systems, Inc.) is installed on a Configuration Management Station (CMS) that is used to securely configure an AP. Alternatively, eTokens available from Cisco Systems, Inc. that contain a signed PK certificate can be used. An eToken is accessed via a Universal Serial Bus (USB) port.

In accordance with an aspect of the present invention, a signed Authorized CMS list is supplied for each AP with Strong Configuration Security enabled. Each list contains the respective AP's PK identity and the PK identity of one or more authorized CMSs. Each list is signed with a private key that corresponds to the public key configured on the AP.

In accordance with an aspect of the present invention, location specific parameters can be provided to access points based on their location.

Still other objects of the present invention will become readily apparent to those skilled in this art from the following description wherein there is shown and described a preferred embodiment of this invention, simply by way of illustration of one of the best modes best suited to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Figure 1:
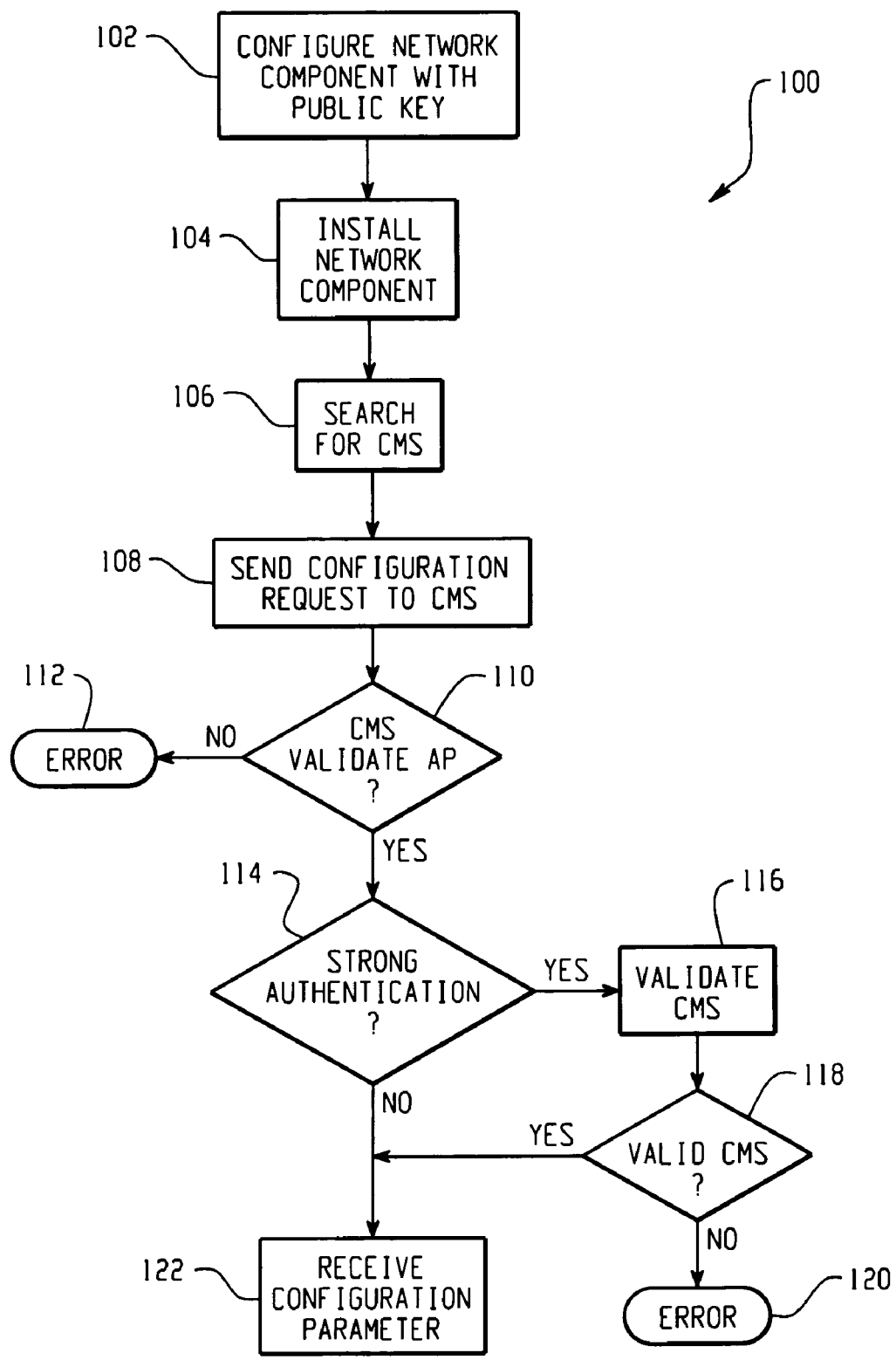
FIG. 1 is a block diagram of a methodology for configuring a network component in accordance with an aspect of the present invention.

Throughout this description, the preferred embodiment and examples shown should be considered as exemplars, rather than limitations, of the present invention.

In accordance with an aspect of the present invention, there is described herein a secure AP configuration protocol. As used herein, AP includes an access point such as an 802.11 access point as well as a wireless switch that is connected to relatively dumb AP like radio modules, wherein AP configuration is in the wireless switch. The wireless switch may perform Layer 2 bridging functions and/or Layer 3 routing functions for wireless clients. Public/private keys and public key (PK) security methods are employed to automatically establish a mutual trust relationship and a secure channel between an AP and at least one CMS, so that configuration parameters are securely delivered to the AP.

A node that participates in Public Key (PK) security has a "public key"/"private key" pair. A message that is encrypted or digitally signed with a private key can only be decrypted or authenticated with the corresponding public key. A node's public key must be distributed to communications peers. To simplify public key distribution and reduce the number of public keys that each node must store, a node's public key and node identifier are typically contained within a PK certificate (e.g., an x.509 certificate) that is signed with the private key of a trusted Certificate Authority (CA). Then a node can simply give a peer its certificate and the peer can verify the certificate with the public key of the trusted CA. It should be noted that the identity of a node can be verified with a CA-signed certificate; however, possession of a signed certificate by a node is not sufficient to verify that the node is an authorized communications partner. An "authorized access list" should be employed for that purpose.

Communications hardware companies commonly use a "software license" as a tool for managing software features, so that the software features on a hardware platform can be varied without maintaining multiple software images. For example, a company can ship a hardware product with a single, fully-featured, software image and a software license that selectively enables those software features that the customer purchased. A software license can also be used to "scale" a single software image to the available hardware resources. A software license does not contain customer-specific information.

Aspects of the present invention that provide for automatic and secure configuration of an AP by a CMS include:

1) CMS discovery. An aspect of the present invention is that an AP automatically discovers the CMS.

2) Enabling/Disabling Strong Configuration Security. An aspect of the present invention is to selectively enable and disable automatic strong AP configuration security for some customers without compromising the feature for other customers. Note that strong configuration security can be compromised if it can be easily disabled by an attacker.

3) AP authentication by the CMS. An aspect of the present invention is that the CMS verifies that an AP is a trusted network resource that is authorized to access the network.

4) CMS Authorization by the AP. An aspect of the present invention is for embodiments of the present invention that include strong configuration. When strong configuration is enabled on an AP, then the AP verifies that the AP configuration parameters are from a trusted CMS.

5) Establishing a secure AP/CMS communication channel. An aspect of the present invention enables AP configuration parameters to be delivered with privacy and integrity. The CMS can securely deliver an encrypted and authenticated image over the secure CMS/AP channel in addition to configuration parameters.

6) Location specific and AP specific Configuration parameters. An aspect of the present invention is that a CMS automatically builds a set of configuration parameters for each AP by determining the identity and the location of the AP and by combining enterprise-wide AP parameters with AP specific parameters and location-specific parameters for the respective AP and AP location.

In accordance with an aspect of the present invention, APs are configured with a secret AP specific RADIUS password, which is used to securely forward 802.11 client security credentials from a RADIUS Server to an AP.

In accordance with an another aspect of the present invention, location specific VLAN (Virtual Local Area Network) information is configured on an AP that is attached to the network on a VLAN trunk line.

In accordance with yet another aspect of the present invention, A SWAN AP, e.g., an AP that participates in a Cisco Structured Wireless Aware Network (SWAN) available from Cisco Systems, Inc. (Cisco), 170 West Tasman Drive, San Jose, Calif. 95134, is configured with a Lightweight Extensible Authentication Protocol (LEAP) authentication password, a Network Access Identifier (NAI) and optionally with the IP address of a SWAN Wireless Domain Server (WDS). In an enterprise network with multiple Wireless Domain Servers, an AP is typically bound to the closest WDS; therefore, the WDS IP address configured on an AP is location specific. A SWAN WDS may be co-located with a Central Switch (CS) that provides access to virtual wireless subnets for 802.11 clients. In that case, the co-located CS is also identified by the WDS IP address.

In accordance with still yet another aspect of the present invention, in a typical enterprise network, clients are subdivided into Service Sets, which are identified by a character string called a Service Set Identifier (SSID). A client is configured with an SSID and an AP is configured with a list of one or more service set identifiers (SSIDs). A client associates to an AP that is configured with a matching SSID. Each SSID configured on an AP is bound to a subnet, which may be an Ethernet VLAN or a "virtual wireless subnet" that is accessed via a "Central Switch." By default, a parent AP assigns an associated client to the subnet which is bound to the AP SSID that matches the client's SSID. A client is authorized to use its SSID; therefore, a client is effectively authorized to access a subnet. The set of SSIDs that are configured on an AP is generally the same throughout an enterprise campus network; however, the subnet ID that is configured for each AP SSID can vary by AP location. For example, a "guest" SSID may be bound to guest VLAN 10 in a first building and it may be bound to guest VLAN 20 in a second building. Therefore, the subnet ID that is bound to an AP SSID is location specific.

Currently, a location specific VLAN Name Table is configured on an AP. If a RADIUS server is used to assign clients to a VLAN that is identified by a VLAN name. Each entry in the table contains a VLAN Name and a local VLAN ID. A RADIUS server can optionally assign a client to a VLAN by including a RADIUS attribute, which contains a VLAN name, in the client's RADIUS Access-Accept message. In that case, an AP assigns the client to the VLAN that corresponds to the matching VLAN name in the AP's VLAN name table. The VLAN ID that is mapped to a VLAN name can vary by location.

In accordance with an aspect of the present invention, the present invention provides a method for performing AP specific and location specific configurations, including the aforementioned configurations. Aspects of the present invention include:

1) CMS Discovery.

An AP can automatically discover a CMS via DHCP (or via some other service location protocol). An AP can include an "AP attribute" in a DHCP Request message and a DHCP Server can return the IP address and name of a CMS in a DHCP Reply message. (Note that an AP can send and receive untagged DHCP messages on the native VLAN configured on the AP's Ethernet Switch Port without any manual VLAN configuration on the AP)

2) Enabling/Disabling Strong Configuration Security

Mandatory CMS Authentication and Authorization can be enabled on an AP by a software license installed on the AP at the factory. When mandatory CMS Authentication and Authorizaton is enabled, not only does the CMS authenticate and authorize the AP, but the AP also authenticates and authorizes the CMS. As noted before, software licenses are commonly used to selectively enable software features. Any method can be used to securely configure an AP with a software license. If AP software licensing is not required for other reasons, then installation of a public key (for example a Cisco public key) on an AP at the factory can enable mandatory CMS Authentication and Authorization.

3) AP Authorization by the CMS

An unconfigured AP sends its certificate (e.g., a its x.509 certificate) to a CMS. The CMS uses a public key (e.g., for a Cisco CMS a Cisco public key) to authenticate the AP's certificate and the AP's identity. A CMS determines that an AP is authorized to access the network, if the AP's identifier is contained in the CMS's "Authorized AP List"

4) CMS Authorization by the AP. In accordance with an aspect of the present invention, embodiments of the present invention include the AP authenticating and authorizing the CMS. A CMS sends to the AP its signed "Authorized CMS List" The AP validates the Authorized CMS List with the key installed on the AP at the factory (for example a manufacturer public key, such as a Cisco Public Key). A CMS is authorized to configure the AP if the CMS identifier is contained in the validated Authorized CMS List.

5) Establishing a Secure AP/CMS Communications Channel. In accordance with an aspect of the present invention, a CMS and AP can use their PK keys, and any algorithm known in the art, to securely establish a shared, secret encryption key and a shared secret message authentication key. Once mutual authentication and shared keys are established between an AP and the CMS, the CMS can securely deliver configuration parameters to the AP. The configuration parameters that a CMS delivers to an AP may include security credentials for other servers, so that the AP can communicate securely with other security/configuration servers (e.g., a RADIUS server or a different configuration server).

6) AP Specific and Location Specific AP Configuration Parameters. If desired, AP specific parameters can be configured on a CMS and indexed by the factory installed AP identifier. However, some AP specific configuration parameters do not have to be configured on a CMS. For example, if an AP can automatically obtain an IP address via DHCP, then the CMS does not need to configure the IP address for the AP. Other examples are an AP Network Access Identifier (NAI) can be automatically derived, and a single RADIUS key can be shared by multiple APs.

A CMS cannot set location specific configuration parameters for an AP until it can determine where the AP is located. Currently, location specific parameter values are dependent on the AP's logical location on the enterprise network. However, AP configuration parameters can also be varied by physical location. For example, it may be useful to vary an 802.11 QoS (Quality of Service) policy applied to 802.11 clients by physical location.

In many cases, the location specific parameters are the same for all APs located on the same AP subnet. In that case, an AP's IP subnet address, which is automatically established via DHCP, is sufficient for identifying the AP's location.

An AP is typically connected to the network by an Ethernet link to an Ethernet Switch port. The Ethernet Switch port generally corresponds to a physical location (e.g., a jack in a conference room); therefore, an AP's physical location is generally identified by the MAC address of its Ethernet Switch port. An AP can discover the MAC address of an Ethernet Switch port (for example an AP can discover the MAC address of a Cisco Ethernet Switch port using the Cisco Discover Protocol "CDP" available from CISCO Technology, Inc., 170 West Tasman Drive, San Jose, Calif. 95134). A CMS can determine the Ethernet Switch that owns an AP Ethernet Switch Port via existing SNMP MIB (Simple Network Management Protocol Management Information Base) information.

In accordance with an embodiment of the present invention, the AP forwards its IP subnet address and Ethernet Switch port address to a CMS. A customer configures location specific parameters by AP subnet and if desired by Ethernet Switch or Ethernet Switch Port. A customer configures an AP Configuration Template which contains the configuration parameter values that are common to all APs in an arbitrary grouping (e.g., all APs in a WLAN). The set of configuration parameters for a single AP is constructed by applying AP specific and location specific parameters to the AP configuration template.

As an example of a location specific parameter, an AP can be assigned to a wireless switch or wireless domain controller (WDS) based on the AP's IP subnet address.

In accordance with an aspect of the present invention AP SSIDs can be configured as follows. An AP Configuration Template can contain the same set of AP SSIDs for all APs in a configuration grouping (e.g., all APs in the WLAN). Each AP SSID in a configuration template is assigned with a subnet class name, and optionally with a multicast subnet class name. A "guest" SSID can be assigned to a "guest" subnet class for example. A customer must also configure location specific subnet class tables, where each table is indexed by an AP location identifier (e.g., an AP subnet address, Switch Identifier, and/or Switch Port identifier) and each entry in a table maps a subnet class name to a local subnet identifier (e.g., a VLAN ID or a virtual wireless subnet ID). The set of SSIDs for a single AP is constructed by translating the subnet class names, and optionally the multicast subnet class name, to the subnet identifiers that correspond to the matching entries in the subnet class table that corresponds to the AP's location. The subnet class name configured for an AP SSID can be translated to a subnet identifier either by a CMS or by the AP.

In accordance with an aspect of the present invention, an AP can automatically derive the set of VLAN IDs that must be enabled on AP interfaces from the set of VLAN IDs that are configured for AP SSIDs. Alternatively, an AP may obtain the set of VLAN IDs that must be enabled on AP interfaces from the CMS. The VLAN ID's may be location specific.

In accordance with an aspect of the present invention, a CMS can simply configure an AP with the necessary information and security credentials to communicate with other configuration servers. For example, a CMS may install LEAP credentials on an AP so that it can mutually authenticate with a RADIUS server via a location specific wireless switch or wireless domain server (WDS). In that case, location specific AP parameters may be obtained from the RADIUS server, from a local wireless domain server, or from a local wireless switch.

Figure 2:
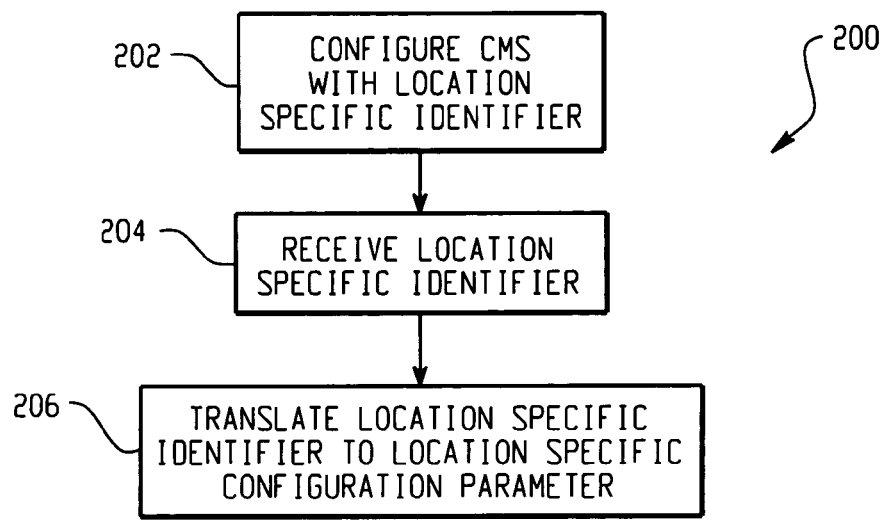
FIG. 2 is a block diagram for configuring a location specific parameter of a network component in accordance with an aspect of the present invention.

In view of the foregoing structural and functional features described hereinabove, methodologies in accordance with various aspects of the present invention will be better appreciated with reference to FIGS. 1 and 2. While, for purposes of simplicity of explanation, the methodologies of FIGS. 1 and 2 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Referring to FIG. 1, there is described a methodology 100 for configuring a network component, such as an access point or a wireless switch, in accordance with an aspect of the present invention. At 102, the network component is configured with a public key. The public key should be securely installed on the network component, i.e., at the factory or via some other physically secure method. The public key can be self-signed or signed by a certificate authority, such as a Cisco certificate authority described herein supra. The public key is suitably adapted to be recognized by a configuration management server after the network component is installed.

At 104, the network component is installed in the network. The installation performed at 104 is the physical installation of the network component. Any power or physical network connections, whether wired or wireless, are made.

At 106, the network component searches for a CMS. The network component can automatically discover a CMS via DHCP or via some other service location protocol. A network component can include an "AP attribute" in a DHCP Request message and a DHCP Server can return the IP address and name of a CMS in the DHCP reply message. A network component can send and received untagged DHCP messages on the native VLAN configured on the network component's Ethernet switch port without any manual VLAN configuration on the network component.

At 108, the network component initiates communication with a CMS. The network component sends a certificate, such as a x.509 certificate, to the CMS. The CMS uses a public key, such as a Cisco Public Key, to authenticate the network component's certificate and the network component's identity.

At 110, the CMS validates the network component. The CMS receives a certificate, such as a x.509 certificate, from the network component. The CMS then attempts to validate the certificate. For example, if the CMS receives a x.509 certificate it will employ a public key, either configured on the CMS or obtained from a CA, to authenticate the certificate and to ascertain the network component's identity. An embodiment of the present invention further contemplates that the CMS has an 'Authorized AP list' or similar such list for other types of network components, and the CMS determines that an AP is authorized to access the network if its identifier is contained in the authorized AP list.

If at 110, it the CMS does not validate the network component (NO) an error condition occurs and is handled at 112. There are several alternatives available for responding to a CMS not validating a network component. For example, the network component may abort the configuration process. Alternatively, the network component may search for other CMS's on the network and repeat steps 108 and 110 until the network component finds the appropriate CMS, or if no CMS is found then aborting the configuration process.

At 114, it is determined if strong authentication security has been enabled. If strong authentication security has been enabled, then the network component verifies that the CMS is authorized to configure the network component. If strong authentication security has been enabled (YES) at 114, then at 116 the network component validates the CMS. The CMS sends the network component a signed "Authorized CMS List." The list can be signed by a CA, such as a Cisco CA, or by a key installed at the factory. The network component validates the Authorized CMS list with the public key installed on the network component at the factory. A CMS is authorized to configure the network component if the CMS identifier is contained in the validated Authorized CMS list.

At 118, if the CMS is not a valid CMS (NO), then an error condition 120 is reached. At 120, the network component can abort the configuration process, or alternatively search for another CMS and repeating steps 116 and 118 until the correct CMS is found. In addition, steps 108 and 110 may also be repeated while the network component searches for the appropriate CMS. If the network component is unable to validate a CMS on the network then the configuration process is aborted.

If at 118, the network component validates the CMS (YES), then at 122 the network component receives a configuration parameter. Alternatively, if at 114 it is determined that strong authentication security has not been enabled (NO), at 122 the network component receives a configuration parameter. The CMS and network component can use their PK keys and any known algorithm to securely establish a shard, mutual, secret encryption key and a shared, secret message authentication key for receiving the configuration parameter at 122. Once mutual authentication and shared keys are established between a network component and the CMS, the CMS can securely deliver configuration parameters to the network component. Configuration parameters that a CMS delivers to the network component can include security credentials for other servers so that the network component can communicate securely with other security/configuration servers (e.g., a RADIUS server or a different configuration server). The CMS can securely deliver an encrypted and authenticated image over the secure CMS/AP channel, in addition to configuration parameters.

Referring now to FIG. 2, there is illustrated a methodology 200 that configures a network component based on a location specific parameter. Although the methodology 200 is shown as a separate and independent method, an aspect of the present invention is that it can also be suitably adapted to operate in conjunction with methodology 100 of FIG. 1. For example, at step 108 of FIG. 1 when the network component initiates communication with a CMS it can send a location specific identifier and at step 122 a location specific configuration parameter can be received.

At 202, the CMS is configured with a location specific, or AP specific parameter. AP specific and location specific parameters are stored in a database or table accessible to the CMS. For AP specific parameters, the parameters are indexed on the CMS using the factory installed AP identifier. In many cases, location specific configuration parameters for an AP are the same for all APs located on the same AP subnet, therefore location specific parameters can be indexed by subnet. In other embodiments, location specific parameters can be indexed by other location specific identifiers, such as wireless domain controller (WDS), Ethernet switch, and/or Ethernet Switch port.

At 204, the CMS receives a location specific identifier from a network component, such as an AP. At 206, the CMS translates the location specific identifier to a location specific configuration parameter using the table or database configured at step 202.

For example, AP SSIDs can be configured as follows. An AP configuration template can contain the same set of AP SSIDs for all APs in a configuration grouping (e.g., all APs in the WLAN). Each AP SSID in a configuration template is assigned with a Subnet Class Name and optionally with a Multicast Subnet Name. A guest SSID can be assigned to Subnet Class Tables, where each table is indexed by an AP location identifier, such as an AP subnet address, switch identifier and/or switch port identifier. Each entry in the Subnet Class Tables maps a Subnet Class Name (and optionally Multicast Subnet Class Name) to a local subnet identifier (e.g., a VLAN ID or a virtual Subnet identifier) corresponding to a location. For example, a "guest" SSID can be bound to guest VLAN 10 in a first building and guest VLAN 20 in a second building. When a new AP requests to be configured, it can send a configuration parameter such as the IP Subnet, Ethernet Switch and/or Ethernet switch port that enables the CMS to determine whether the AP is in the first building or second building, and translate the location specific identifier to a location specific configuration parameter to set the AP's guest VLAN to either VLAN 10 or VLAN 20 accordingly.

Figure 3:
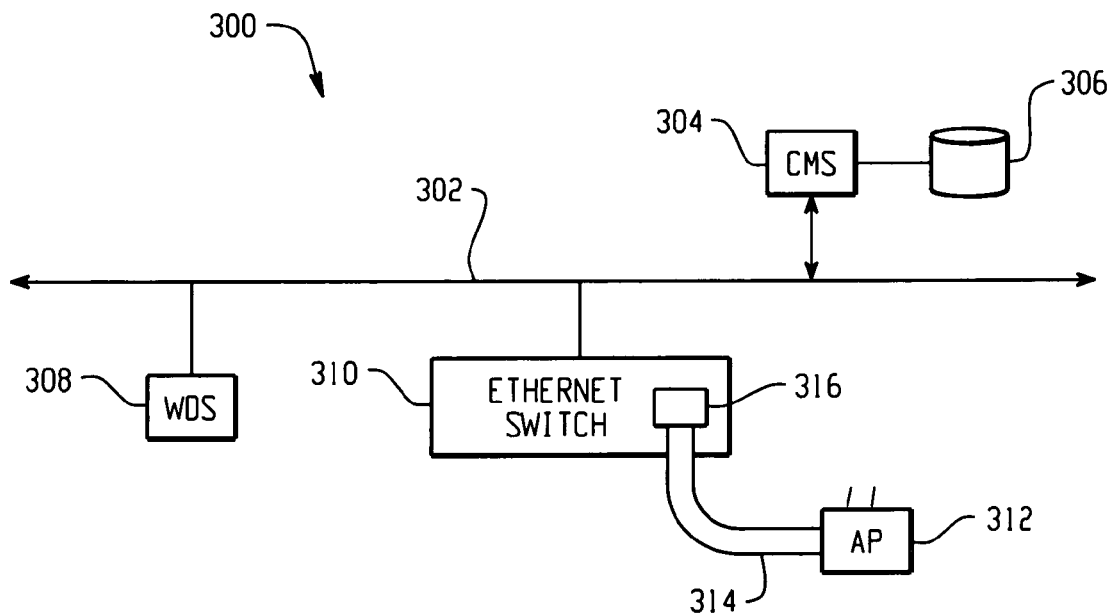
FIG. 3 is an example of a network configured in accordance with an aspect of the present invention.

FIG. 3 is an example network 300 configured in accordance with an aspect of the present invention. As shown, the network 300 comprises a backbone 302 enabling various components of the network to communicate with each other. Backbone 302 is suitably any combination wireless and/or wired network topologies. A configuration management server (CMS) 304 is communicatively coupled to backbone 302. CMS 304 has a data storage 306. Data storage 306 is used for at least one of storing configuration parameters for network components and storing authentication data for authorizing network components. For example, data storage 306 suitably comprises at least one of a lookup table and a database that is suitably configured with at least one of a network wide configuration parameter, a location specific configuration parameter and a network component (e.g., AP) specific parameter.

WDS 308 is communicatively coupled to network backbone 302. WDS 308 is suitably adapted to control or provide a service to a set of AP', wireless switches and/or other network components.

Ethernet switch 310 is used for coupling AP 312 to backbone 302. AP 312 is attached is connected to an Ethernet Switch port 316 of Ethernet switch 310 via a communications link 314. Communications link 314 is suitably any bi-directional communications link that enables the AP to send and receive data. AP 312 is configured with a public key at the factory to enable the CMS to be authenticated by CMS 304.

In the example of FIG. 3, AP 312, a new AP that is being installed, When AP 312 is first installed, it automatically searches for CMS 304. In an embodiment of the present invention, AP 312 automatically discovers CMS 304 via DHCP or some other service location protocol. An AP can include an "AP attribute" in a DHCP Request Message and a DHCP server, for example WDS 308 can be configured to function as a DHCP server, and can return the IP address and name of a CMS in a DHCP reply message.

AP 312 sends a PK certificate (such as an X.509 certificate) to CMS 304. CMS validates the certificate, using data stored in data storage 306, or by third party authentication such as a certificate authority.

If strong authentication security is enabled on AP 312, AP 312 requests a Authorized CMS List from CMS 304 to validate CMS 304. AP 312 validates CMS 304 using a key installed on AP 312.

After authentication between AP 312 and CMS 304 has successfully completed, then CMS 304 uses data storage 306 to obtain configuration parameters for AP 312. If AP 312 uses location specific parameters, AP 312 would send a location specific identifier to CMS 304. For example, AP 314 can obtain the identity of its Ethernet Switch port 314, Ethernet switch 316 and/or its IP subnet. The location specific identifier is sent to CMS 304 which uses data stored in data storage 306 to translate the location specific identifier to a location specific parameter.

Figure 4:
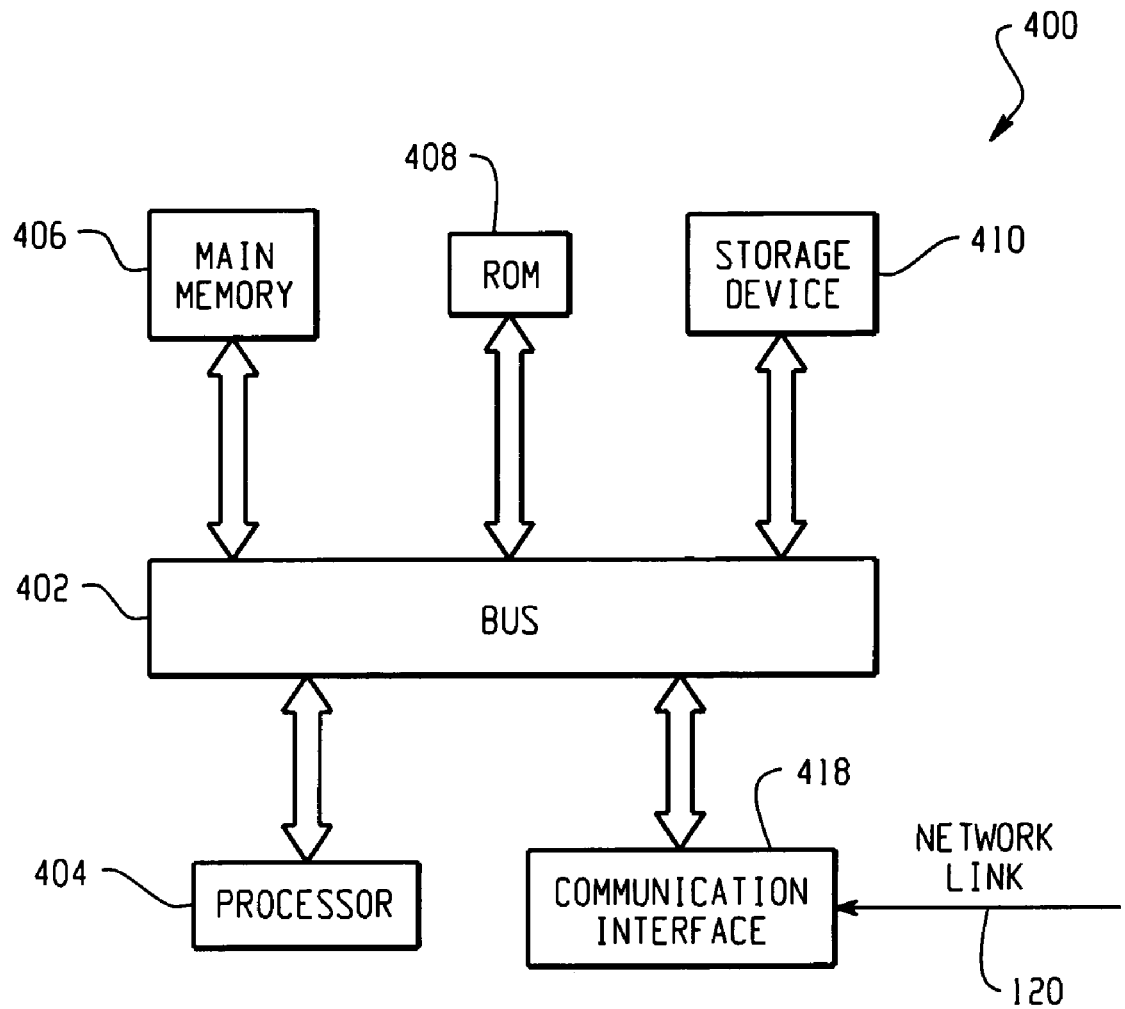
FIG. 4 is an example processing system suitably adaptable for implementing a methodology of the present invention.

FIG. 4 is a block diagram that illustrates a computer system 400 upon which an embodiment of the invention may be implemented. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a ready only memory (ROM) 408 or other static storage device coupled to bus 402 for storing static information and instructions for processor 404. A storage device 410, such as a magnetic disk or optical disk, is provided and coupled to bus 402 for storing information and instructions.

The invention is related to the user of computer system 400 for automatically configuring access points. According to one embodiment of the invention, automatic configuration of an access point is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media and volatile media. Non-volatile media include for example optical or magnetic disks, such as storage device 410. Volatile media include dynamic memory such as main memory 406. Common forms of computer-readable media include for example floppy disk, a flexible disk, hard disk, magnetic cards, paper tape, any other physical medium with patterns of holes, a RAM, a PROM an EPROM, a FLASHPROM, any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network, or for example to network backbone 302 of FIG. 3. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information. Network link 120 typically provides data communication through one or more networks to other data devices.

Computer system 400 can send messages and receive data, including program codes, through network link 420, and communication interface 418. The received code may be executed by processor 404 as it is received, and/or stored in storage device 410, or other non-volatile storage for later execution.

The received code may be executed by processor 404 as it is received, and/or stored in storage device 410, or other non-volatile storage for later execution. In this manner, computer system 400 may obtain application code in the form of a carrier wave.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method for configuring an access point, comprising:
   sending a discover request message requesting an address for a configuration management server;
   receiving a response to the discovery request, the response comprising an address for the configuration management server;
   sending a configuration request to the configuration management server at the address received in the response;
   sending a certificate to the configuration management server at the address received in the response, the certificate signed by one of a private key assigned to the access point and a private key of a certificate authority; and
   receiving a configuration parameter from the configuration management server.

2. The method of claim 1, wherein the access point receives the configuration parameter securely using one of the private key assigned to the access point and the private key of a certificate authority.

3. The method of claim 2, wherein the configuration parameter comprises a security credential for at least one other server, enabling the access point to communicate securely with the at least one other server.

4. The method of claim 3, wherein the at least one other server is at least one of a RADIUS server and a different configuration server.

5. The method of claim 1, further comprising
   obtaining a location specific parameter;
   sending the location specific parameter to the configuration management server; and
   receiving a location specific configuration parameter from the configuration management server based on the location specific parameter.

6. The method of claim 5, wherein the location specific identifier is at least one of a subnet address, a VLAN identifier, an Ethernet switch identifier and an Ethernet switch port.

7. The method of claim 6, wherein the location specific parameter is a subnet identifier bound to a service set identifier.

8. The method of claim 1,
   wherein the response is a Dynamic Host Control Protocol (DHCP) reply message, the DHCP reply message contains the network name of the configuration management server and the access point determines the IP address of the configuration management server via a domain name server.

9. A system, comprising:
   a first server operable to manage a pool of network addresses;
   a configuration management server; and
   a network component communicatively coupled to the first server and the configuration management server, the network component is configured with a public key;
   wherein the network component is operable to send a first request to the first server to request to request data to contact the configuration management server;
   wherein the first server is operable to receiving the first request to send a reply comprising an address for contacting the configuration management server;
   wherein the network component is responsive to receiving the reply to initiate a communication with the network configuration server at the address provided by the first server to obtain a configuration parameter;
   wherein the network configuration management server is responsive to the communication to verify that the configuration management server is authorized to configure the network component.

10. The system of claim 9, wherein the configuration management server further comprises a list that contains the identity of an authorized network component, the configuration management server verifying the network component is on the list.

11. The system of claim 10, wherein the list is signed by a private key corresponding to the public key of the network component.

12. The system of claim 10, further comprising:
    the configuration management server configured to send a configuration management list to the network component responsive to the communication;
    the network component responsive to receiving the configuration management list is configured to validate the list using the public key;
    wherein the network component determines that the configuration management server is authorized to configure the network component responsive to validating the configuration management list with the public key.

13. The system of claim 10, further comprising
    the network component is further configured to obtain a location specific parameter;
    the network component is further configured to send the location specific parameter to the configuration management server; and
    the configuration management server responsive to receiving the location specific parameter to send a location specific configuration parameter to the network component.

14. The system of claim 13, wherein the location specific parameter is at least one of a subnet address, a VLAN identifier, an Ethernet Switch identifier, and an Ethernet switch port.

15. The system of claim 14, wherein the location specific parameter is a subnet identifier bound to a service set identifier.

16. The system of claim 13, further comprising the configuration management server configured to index a set of location specific configuration parameters for the network component.

17. The system of claim 13, further comprising
the configuration management server configured to assign a subnet class name to a service set identifier;
the configuration management server configured to assign the subnet class name to the location specific identifier;
the configuration management server adapted to configuring location specific subnet class name tables to map subnet class names to a location specific subnet identifier; and
the configuration management server is configured for translating the location specific parameter sent by the network component to the corresponding location specific subnet class name table and the location specific subnet identifiers contained in the table.

18. A computer-readable medium of instructions, comprising:
means for configuring a network component with a public key;
means for communicating with a first server to obtain an address of a configuration management server;
means for receiving from the first server the address of the configuration management server;
means for initiating a communication with the configuration management server with the address received by the means for receiving;
means for validating the configuration management server is authorized to configure the network component by validating the configuration management server with the public key; and
means for obtaining a configuration parameter from the configuration management server.

19. The computer-readable medium of instructions of claim 18, further comprising
means for setting a configuration parameter of the network component based on the obtained from the configuration management server.

20. A computer-readable medium of instructions of claim 18, further comprising:
means for storing a configuration parameter based on a location specific identifier;
means for receiving a configuration request comprising a location specific identifier for a network component; and
means for determining a location specific configuration parameter based on the location specific identifier.

21. The computer-readable medium of instructions of claim 20, wherein the location specific identifier is at least one of a subnet address, a VLAN identifier, an Ethernet switch identifier and an Ethernet switch port.

22. The computer-readable medium of instructions of claim 20, further comprising:
means for assigning a subnet class name to a service set identifier;
means for assigning the subnet class name to location specific subnet identifiers;
means for configuring location-specific subnet class name tables to map subnet class names to a location specific subnet identifiers; and
means for translating a location specific identifier sent by an access point to the corresponding location-specific subnet class name table and the location-specific subnet identifiers contained in the table.

23. The system of claim 9, wherein the first server is a Dynamic Host Control Protocol (DHCP) server, the first request is a DHCP request and the reply is a DHCP reply.

24. The system of claim 23, wherein the DHCP request comprises an AP attribute.

25. The system of claim 24, wherein the DHCP reply comprises the Internet Protocol (IP) address of the configuration management server.

26. The system of claim 9, wherein transmits a software image to the network component responsive to verifying that the configuration management server is authorized to configure the network component.

27. The computer-readable medium of instructions of claim 18, wherein the first server is a Dynamic Host Control Protocol (DHCP) server, the first request is a DHCP request and the reply is a DHCP reply.

28. The computer-readable medium of instructions of claim 27, wherein the DHCP request comprises an AP attribute.

29. The computer-readable medium of instructions of claim 28, wherein the DHCP reply comprises the Internet Protocol (IP) address of the configuration management server.

30. The computer-readable medium of instructions of claim 18, wherein transmits a software image to the network component responsive to verifying that the configuration management server is authorized to configure the network component.

* * * * *